Feb. 22, 1927.
C. BLOMSTROM
MECHANIC'S SOAP
Filed Oct. 24, 1924
1,618,323
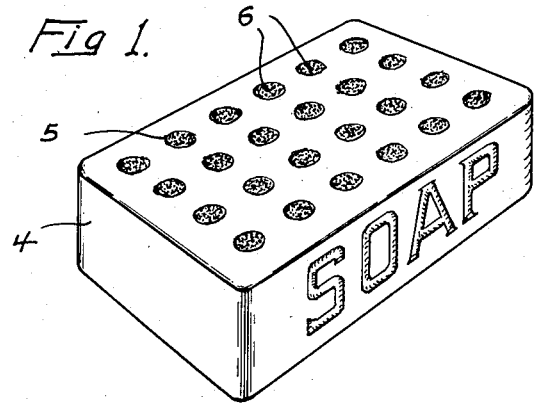
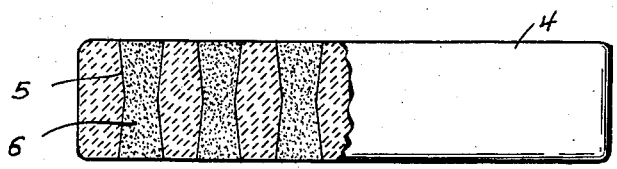
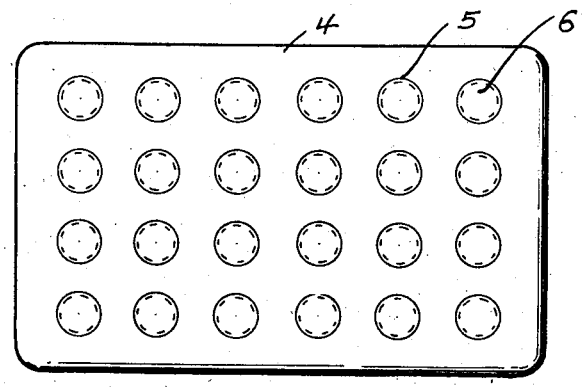
INVENTOR
Charles Blomstrom Patented Feb. 22, 1927.

1,618,323

UNITED STATES PATENT OFFICE.

CHARLES BLOMSTROM, OF MINNEAPOLIS, MINNESOTA.

MECHANIC'S SOAP.

Application filed October 24, 1924. Serial No. 745,618.

My invention relates to a scouring soap which has slugs of a gritty material imbedded therein and which is used by mechanics and others to remove grease, stains and paint from hands and face. This gritty material has a tendency to shrink when dried and often to such an extent that the slugs will fall out, especially when the bar of soap becomes thin from usage.

The object of my invention is to combine a soap that contains fats and oils, with a scouring soap containing grit, in such manner that the slugs of gritty material therein will be securely anchored, even though the bar becomes worn to a very thin form.

My invention consists of a bar or flat cake of soap, provided with a large number of transverse holes which are tapered from both sides to the center of said cake, and in which said holes are filled with a gritty scouring material.

My invention consists, further, of the features shown in the drawing and pointed out in the following description and claims:

In the drawing:—

Fig. 1 is a perspective view of a cake of soap embodying my invention.

Fig. 2 is an edge view of a cake of soap partially broken away to show the inserts hereinafter described, Fig. 3 is a plan view of same.

In all the views, numeral (4) represents a cake of soap of the usual kind in which animal fat or vegetable oil is the predominating substance. This cake or bar may be of any suitable size and shape, and during the forming or moulding process of said bar, a number of holes (5) are formed therein. The holes (5) extend thru said cake of soap from one side to the other and are preferably circular in cross section and of smaller diameter in the center of said cake as shown. The holes (5) are filled with a plug (6) of soap containing grit or other scouring substance in a plastic form which hardens and becomes permanently fixed therein, and owing to the constricted central part of the holes (5), will remain therein even though the cake becomes very thin from usage.

It is evident that the holes (5) may be of square, oblong or irregular cross-section, and the cake (4) may be of any desired shape, and also the composition of the cake (4) and plugs (6) may be varied to suit requirements, and yet be within the scope of my invention.

In actual use this soap, as shown and described, has been found exceptionally effective, and it provides a lather which carries sufficient scouring substance to make it a cleansing agent of unusual merit.

I claim as my invention:—

1. A cake of soap formed as an integral body and having a plurality of passages extending from one side to the other thereof, said passages being of less transverse dimension adjacent the central plane between said sides, and slugs of granular scouring material adapted to wear away as the soap wears entirely filling said passages, whereby said material owing to its cohesion cannot drop out of said passages but will be retained therein until the cake is substantially used up.

2. An integral cake of soap having sides spaced a smaller distance than the length or width of said cake, a plurality of slugs of granular scouring material disposed in the cake and extending from one of said sides to the other and adapted to be worn even with the surface of said cake of soap, said slugs tapering to a smaller transverse cross section adjacent the central plane extending between said sides whereby said slugs owing to their cohesion cannot fall out of said cake and said cake will retain said slugs until substantially used up.

In witness whereof, I have hereunto set my hand this 20th day of October, 1924.

CHARLES BLOMSTROM.